(12) United States Patent
Morishita

(10) Patent No.: US 8,818,671 B2
(45) Date of Patent: Aug. 26, 2014

(54) VEHICLE BRAKE CONTROL DEVICE

(75) Inventor: Shinichiro Morishita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/824,934

(22) PCT Filed: Jun. 25, 2012

(86) PCT No.: PCT/JP2012/066124
§ 371 (c)(1),
(2), (4) Date: Mar. 18, 2013

(87) PCT Pub. No.: WO2013/002168
PCT Pub. Date: Jan. 3, 2013

(65) Prior Publication Data
US 2013/0184953 A1    Jul. 18, 2013

(30) Foreign Application Priority Data

Jun. 27, 2011   (JP) ................................ 2011-141799

(51) Int. Cl.
| | |
|---|---|
| *B60T 8/24* | (2006.01) |
| *B60T 13/10* | (2006.01) |
| *B60T 7/12* | (2006.01) |
| *B60T 13/14* | (2006.01) |
| *B60T 13/66* | (2006.01) |
| *B60T 8/48* | (2006.01) |
| *B60T 7/04* | (2006.01) |
| *B60T 13/68* | (2006.01) |
| *B60T 8/40* | (2006.01) |

(52) U.S. Cl.
CPC ................. *B60T 8/245* (2013.01); *B60T 13/10* (2013.01); *B60T 8/24* (2013.01); *B60T 7/122* (2013.01); *B60T 13/142* (2013.01); *B60T 13/662* (2013.01); *B60T 8/4872* (2013.01); *B60T 7/042* (2013.01); *B60T 13/146* (2013.01); *B60T 13/686* (2013.01); *B60T 8/4045* (2013.01)
USPC .................................. 701/70; 701/78; 701/79

(58) Field of Classification Search
CPC ..... B60T 8/172; B60T 8/1761; B60T 8/1812; B60T 8/24; B60T 8/245; B60T 13/02; B60T 13/10; B60T 13/12; B60T 13/14; B60T 13/141; B60T 13/142; B60T 13/143; B60T 13/161; B60T 13/162; B60T 7/122; B60T 8/4872; B60T 7/042; B60T 13/146; B60T 13/686; B60T 8/4045
USPC ................. 701/70, 71, 78, 79, 80, 82, 83, 93; 303/15, 11
See application file for complete search history.

(56) References Cited

U.S. PATENT DOCUMENTS

| | | | |
|---|---|---|---|
| 2008/0136249 A1* | 6/2008 | Park et al. ..................... | 303/9.75 |
| 2008/0201052 A1* | 8/2008 | Kato et al. ...................... | 701/93 |

FOREIGN PATENT DOCUMENTS

| | | | |
|---|---|---|---|
| JP | 8-164835 | A | 6/1996 |
| JP | 2000-203401 | A | 7/2000 |
| JP | 2005-059626 | A | 3/2005 |
| JP | 2006-096218 | A | 4/2006 |
| JP | 2008-94246 | A | 4/2008 |
| JP | 2008-207687 | A | 9/2008 |
| JP | 2008207687 | A * | 9/2008 |
| JP | 2009-262766 | A | 11/2009 |
| JP | 2010-137706 | A | 6/2010 |
| JP | 2010-241162 | A | 10/2010 |

OTHER PUBLICATIONS

An English translation of the Korean Office Action for the corresponding Korean patent application No. 10-2013-700-7660 issued on Feb. 26, 2014.

* cited by examiner

*Primary Examiner* — Richard Camby

(74) *Attorney, Agent, or Firm* — Global IP Counselors, LLP

(57) ABSTRACT

A vehicle brake controller is provided with a master cylinder, a wheel cylinder, a brake hydraulic actuator, a vehicle-stop-state motor-OFF controller and a pressurization rate controller. The vehicle-stop-state motor-OFF controller performs a vehicle-stop-state motor-OFF control that stops the pump motor upon the vehicle being stopped by the brake operation, and that maintains a stop state of the pump motor as is during stopping of the vehicle. The pressurization rate controller adjusts a pressurization rate of the wheel cylinder pressure to a higher value as a road surface gradient becomes larger upon resuming operation of the pump motor after the vehicle-stop-state motor-OFF control ends due to acceleration from the vehicle stop state.

8 Claims, 8 Drawing Sheets

VEHICLE BRAKE CONTROL DEVICE

CROSS-REFERENCE TO RELATED APPLICATIONS

This application is a U.S. National stage application of International Application No. PCT/JP2012/066124, filed Jun. 25, 2012, which claims priority under to Japanese Patent Application No. 2011-141799, filed in Japan on Jun. 27, 2011, the entire contents of which is hereby incorporated by reference.

FIELD OF THE INVENTION

The present invention relates to a vehicle brake controller having a brake hydraulic actuator that has a pump motor and a differential pressure valve.

BACKGROUND INFORMATION

As a conventional vehicle brake device, from the brake pedal stroke, the master cylinder pressure, etc., the driver input quantity is detected, and the driver input quantity and the deceleration requested by the driver characteristics map are used to compute the deceleration requested by the driver. Then, in order to realize the computed deceleration requested by the driver, with respect to the negative pressure booster output (the basic hydraulic pressure portion) from the master cylinder, the generation of the additional brake portion is known by feed forward control (for example, see Japanese Laid-Open Patent Application No. 2006-96218).

SUMMARY

For the conventional vehicle brake device, the additional brake portion is obtained in the brake hydraulic actuator arranged between the master cylinder and each wheel cylinder by the differential pressure valve control and the pump-up pressurization. That is, a wheel cylinder pressure higher than the master cylinder pressure is generated by the pump-up pressurization, and the additional brake portion is obtained from the pressure difference between the wheel cylinder pressure and the master cylinder pressure.

Consequently, in a brake operation, the pump motor for pump-up pressurization of the brake hydraulic actuator should always be kept on. Here, in order to guarantee the durability of the pump motor, control is carried out so that even when the vehicle stops or is being slowed down by applying brakes, the pump motor is still turned off while the wheel cylinder pressure is maintained. In such cases, when the brake pedal is maintained at the time of the gradual acceleration of the vehicle's speed while the brake pedal is released and when the brake pedal is depressed again, the brake hydraulic actuator works so that an odd pedal feeling or odd deceleration feeling takes place. This situation is undesirable.

The purpose of the present invention is to solve the problems of the prior art described above by providing a vehicle brake controller that can more reliable guarantee the durability of the pump motor while the vehicle stops and, at the same time, can suppress the odd deceleration feeling and the odd pedal feeling when a vehicle speed is accelerating from the vehicle stop state.

In order to realize the purpose of the present invention, the vehicle brake controller of the present invention has a master cylinder, wheel cylinders, brake hydraulic actuators, a vehicle-stop-state motor-OFF controller, and a pressurization rate controller.

The master cylinder generates a master cylinder pressure corresponding to the brake operation.

A wheel cylinder is arranged at each of the front/rear wheels, and the wheel cylinder provides the hydraulic brake force corresponding to the wheel cylinder pressure to the corresponding wheel.

A brake hydraulic actuator is installed between the master cylinder and the wheel cylinder, and the brake hydraulic actuator has a hydraulic pump driven by a pump motor and a differential pressure valve that controls the differential pressure between the wheel cylinder pressure and the master cylinder pressure.

The vehicle-stop-state motor-OFF controller stops the pump motor when the vehicle is stopped by the brake operation, and the vehicle-stop-state motor controller maintains the stop state of the pump motor as is during stop operation of the vehicle.

The pressurization rate controller controls the vehicle so that, after the end of the vehicle-stop-state motor-OFF control due to acceleration from the vehicle stop state, while the pump motor is turned on again, the pressurization rate of the wheel cylinder pressure is higher when the road surface gradient is larger.

Consequently, when the vehicle stops due to the brake operation, and the brake pedal is stepped down upon during the vehicle-stop-state motor-OFF control, the differential pressure is decreased by the differential pressure valve; while the wheel cylinder pressure is maintained as is, the master cylinder pressure is increased. Then, when the brake pedal is released, while the master cylinder pressure decreases, the wheel cylinder pressure decreases. As a vehicle speed is generated due to a decrease in the wheel cylinder pressure, the vehicle-stop-state motor-OFF control comes to an end.

When the wheel cylinder pressure is lower than the level for realizing the target deceleration at the time when the vehicle-stop-state motor-OFF control ends, a pressurization instruction is output to increase the decreased wheel cylinder pressure by the differential pressure valve control and the pump-up pressurization.

Under this pressurization instruction, the pressurization rate controller sets a higher pressurization rate for a larger road surface gradient. Consequently, when the road is a flat road or has a lower gradient, the pressurization rate is lower, so that when a vehicle speed is generated, it is possible to suppress the generation of a rapid deceleration or the generation of a rapid decreasing pedal reactive force.

In addition, when the road has a high gradient, the pressurization rate is higher, so that when the vehicle stops on a slope, after acceleration, the wheel cylinder pressure is increased more quickly. As a result, when a vehicle speed is generated from stopping on a upward slope, it is possible to prevent the vehicle from slipping backwards due to a slow pressurization; when a vehicle speed is generated from stopping on a downward slope, the vehicle can be prevented from rushing forward due the a slow pressurization.

As a result, it is possible to guarantee a high durability of the pump motor when the vehicle stops by the vehicle-stop-state motor-OFF control, and, when a vehicle speed is generated from the vehicle stop state, the odd deceleration feeling and the odd pedal feeling can be suppressed. In addition, when a vehicle speed is generated from stopping on an upward slope, the vehicle can be prevented from slipping backward, and, when the vehicle speed is generated from stopping on a downward slope, the vehicle can be prevented from rushing forward.

BRIEF DESCRIPTION OF THE DRAWINGS

Referring now to the attached drawings which form a part of this original disclosure

DETAILED DESCRIPTION OF THE EMBODIMENTS

In the following, the best embodiments of the vehicle brake controller of the present invention will be explained with respect to Application Example 1 shown in the figures.

Application Example 1

First of all, the configuration will be explained.

The configuration of the vehicle brake controller in Application Example 1 will be explained for the following portions: "the overall configuration," "the block configuration of the regeneration coordinated brake control," and "the configuration of the treatment of the regeneration coordinated brake control."

Figure 1:
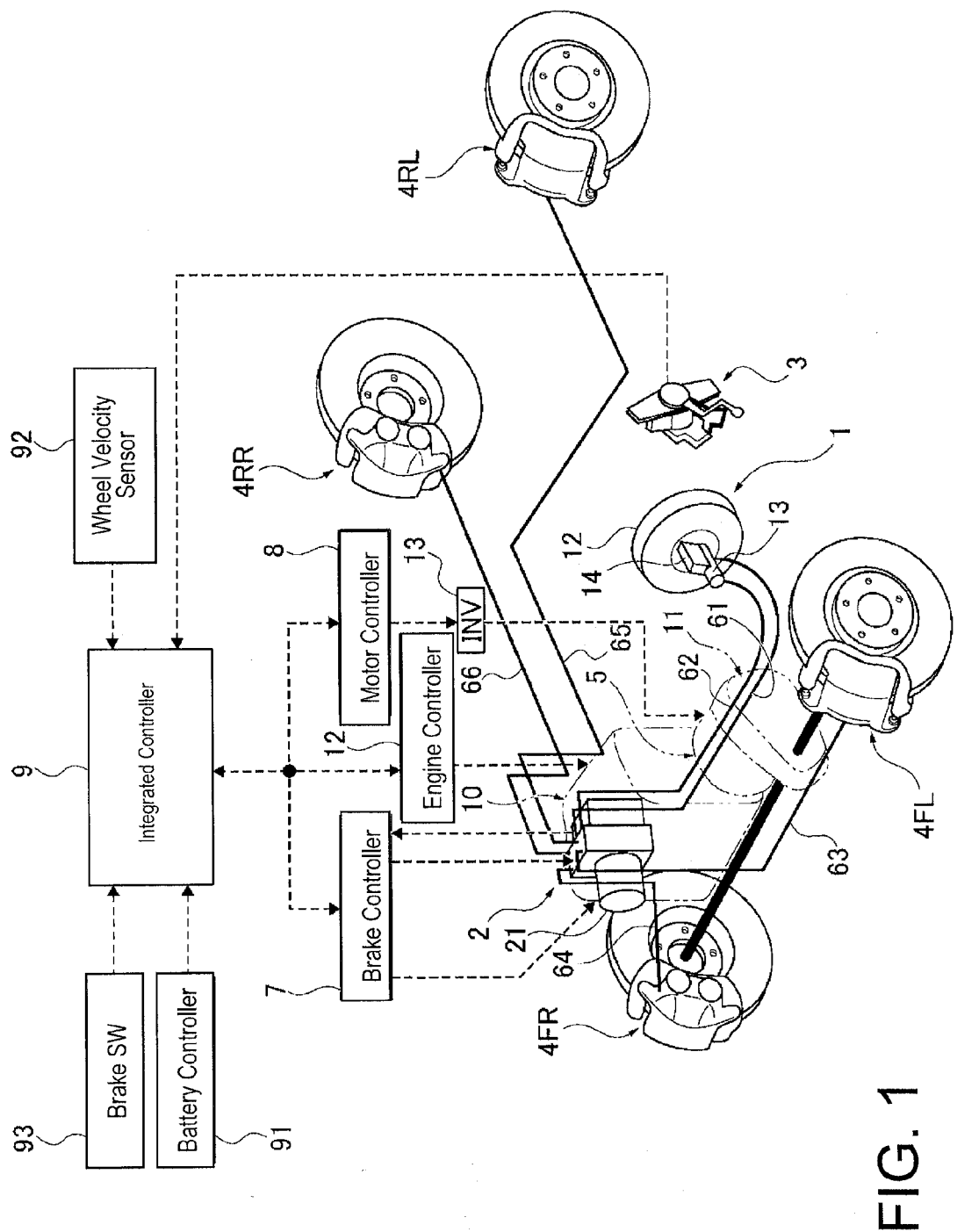
FIG. 1 is a brake system diagram illustrating the configuration of a hybrid vehicle with front wheel drive and adopting the brake controller in Application Example 1.
Figure 2:
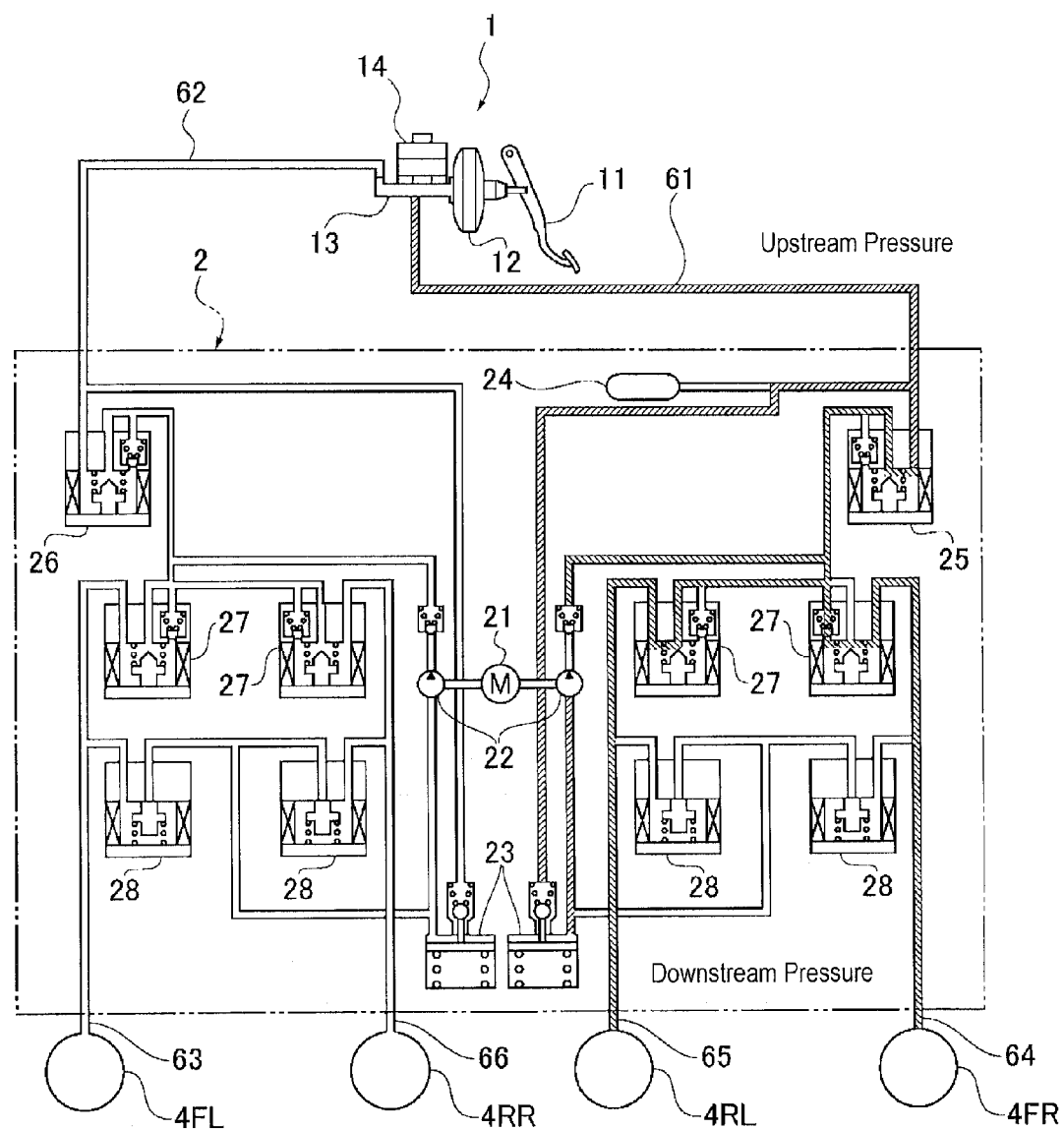
FIG. 2 is a brake hydraulic pressure circuit diagram illustrating the VDC brake hydraulic actuator in the brake controller in Application Example 1.

FIG. 1 is a diagram illustrating the configuration of the hybrid vehicle as an example of the electric vehicle with front wheel drive and using the brake controller of Application Example 1. FIG. 2 is a diagram illustrating the VDC brake hydraulic actuator as an example of the brake hydraulic actuator. In the following, with reference to FIGS. 1 and 2, the overall configuration of the regeneration coordinated brake control system using the VDC will be explained.

As shown in FIG. 1, the brake deceleration generating system of the brake controller in Application Example 1 has a brake hydraulic pressure generator 1, a VDC brake hydraulic actuator 2 (the brake hydraulic actuator), a stroke sensor 3, a left-front wheel cylinder 4FL, a right-front wheel cylinder 4FR, a left-rear wheel cylinder 4RL, a right-rear wheel cylinder 4RR, and a vehicle-driving electric motor 5.

Here, the existing VDC system (VDC stands for "Vehicle Dynamic Control") is used to form the regeneration coordinated brake control system. The VDC system works as follows: when the vehicle posture is disturbed as the vehicle enters a curve at a high speed and a drastic steering wheel operation is carried out, the VDC system carries out vehicle behavior control (equal to the VDC control) to prevent a lateral slip and to realize an excellent running stability. In the VDC control, for example, when the gyration movement on the over-steering side is sensed, the brake is applied on the front wheel on the outer side of the curve. On the other hand, when the gyration movement on the under-steering side is sensed, the driving power is decreased, and, at the same time, the brake is applied on the tire of the rear wheel on the curve inner side.

The brake hydraulic pressure generator 1 is a basic hydraulic pressure generating means that generates the basic hydraulic pressure portion corresponding to the brake operation by the driver. As shown in FIGS. 1 and 2, this brake hydraulic pressure generator 1 has a brake pedal 11, a negative pressure booster 12, a master cylinder 13, and a reservoir 14. That is, the brake stepping force applied by the driver on the brake pedal 11 is doubled by the negative pressure booster 12, and a master cylinder pressure (the primary hydraulic pressure and the secondary hydraulic pressure) is generated by the master cylinder 13. In this case, the deceleration generated by the master cylinder pressure is designed beforehand to be lower than the target deceleration (equal to the deceleration requested by the driver).

The VDC brake hydraulic actuator 2 is installed between the brake hydraulic pressure generator 1 and each of the wheel cylinders 4FL, 4FR, 4RL and 4RR of the various wheels. The VDC brake hydraulic actuator controls the increase, the holding, or the decrease of the master cylinder pressure. The VDC brake hydraulic actuator 2 and the brake hydraulic pressure generator 1 are connected with each other by a primary hydraulic pipe 61 and a secondary hydraulic pipe 62. The VDC brake hydraulic actuator 2 is connected to the wheel cylinders 4FL, 4FR, 4RL and 4RR of the various wheels via the left-front wheel hydraulic pipe 63, the right-front wheel hydraulic pipe 64, the left-rear wheel hydraulic pipe 65 and the right-rear wheel hydraulic pipe 66, respectively. That is, in the brake operation, the master cylinder pressure generated by the brake hydraulic pressure generator 1 is controlled by the VDC brake hydraulic actuator 2, and the obtained pressure is applied on the wheel cylinders 4FL, 4FR, 4RL and 4RR of the various wheels to obtain the hydraulic brake forces.

The specific configuration of the VDC brake hydraulic actuator 2 is shown in FIG. 2. The VDC brake hydraulic actuator has a VDC motor 21, hydraulic pumps 22 and 22 driven by the VDC motor 21 (the pump motor), reservoirs 23 and 23, and a master cylinder pressure sensor 24. The solenoid valves include the first M/C-cut solenoid valve 25 (the differential pressure valve), the second M/C-cut solenoid valve 26 (the differential pressure valve), holding solenoid valves 27, 27, 27 and 27, and pressure-reduction solenoid valves 28, 28, 28 and 28. The first M/C-cut solenoid valve 25 and the second M/C-cut solenoid valve 26 control the differential pressure between the wheel cylinder pressure (the downstream pressure) and the master cylinder pressure (the upstream pressure).

The stroke sensor 3 is a means for detecting the brake pedal depressing quantity from the driver with a potentiometer or the like. This stroke sensor 3 is a member added to the existing VDC system as the stroke sensor has a configuration for detecting the target deceleration (equal to the deceleration requested by the driver), which is a piece of necessary information for the regeneration coordinated brake control.

The wheel cylinders 4FL, 4FR, 4RL and 4RR are set at the brake disks of the various front/rear wheels, respectively, and they apply the hydraulic pressures from the VDC brake hydraulic actuators 2. When the hydraulic pressures are applied to the wheel cylinders 4FL, 4FR, 4RL and 4RR, as each brake disk is held by a brake pad, a hydraulic brake force is applied on each of the front/rear wheels.

The vehicle-driving electric motor 5 is arranged as the driving source for running the left/right front wheels (the driving wheels), and they have both the driving motor function and the power generator function. In the running mode, the vehicle-driving electric motor 5 consumes the battery power while the motor driving force is transmitted to the left/right front wheels. Then, in the regeneration mode, a load is given by driving the left/right front wheels and is converted to an electric energy, which is then charged in the battery. That is, the load for driving the left/right front wheels to rotate becomes the regeneration brake force. In the driving system for the left/right front wheel (the driving wheels) where the vehicle-driving electric motor 5 is arranged, in addition to the vehicle-driving electric motor 5, an engine 10 is arranged as the running driving source, and the driving force is transmitted via a transmission unit 11 to the left/right front wheels.

As shown in FIG. 1, the brake deceleration control system of the brake controller in Application Example 1 has a brake controller 7, a motor controller 8, an integration controller 9, and an engine controller 12.

The brake controller 7 is given the instruction from the integration controller 9 and the pressure information from the master cylinder pressure sensor 24 of the VDC brake hydraulic actuator 2 input to the brake controller. Then, according to the prescribed control rule, a driving instruction is output to the VDC motor 21 and the solenoid valves 25, 26, 27 and 28 of the VDC brake hydraulic actuator 2. In the regeneration coordinated brake control operation, for the brake controller 7, as the pressurization portion instruction is input from the integration controller 9, the differential pressure between the wheel cylinder pressure (the downstream pressure) and the master cylinder pressure (the upstream pressure) is controlled. The differential pressure control is carried out by the differential pressure control by the working the current values to the first M/C-cut solenoid valve 25 and the second M/C-cut solenoid valve 26 with respect to the target differential pressure. Here, the differential pressure control is carried out together with the pump-up pressurization by the VDC motor 21 when VDC motor 21 is on, and the differential pressure control is carried out by only the differential pressure control when the VDC motor 21 is off Here, in addition to the regeneration coordinated brake control, the brake controller 7 also carries out the VDC control, the TCS control and the ABS control, etc.

The motor controller 8 is connected to the vehicle-driving electric motor 5, which is connected to the left/right front wheels as the driving wheels, via the inverter 13. In the regeneration coordinated brake control operation, as the regeneration portion instruction is input from the integration controller 9, and the regeneration brake force control means operates a control corresponding to the regeneration portion instruction having the regeneration brake force generated by the vehicle-driving electric motor 5 input to the regeneration brake force control means. The motor controller 8 also has the function of controlling the motor torque generated by the vehicle-driving electric motor 5 and the motor rotation velocity corresponding to the running state and the vehicle state in running the vehicle.

In the brake operation, the integration controller 9 carries out the regeneration coordinated brake control so that the target deceleration is realized as the sum of the basic hydraulic pressure portion by the master cylinder pressure and the additional brake portion (the regeneration portion by the regeneration brake force and/or the pressurization portion by the VDC brake hydraulic actuator 2). In this case, the target deceleration is determined on the basis of the pedal stroke sensor value from the stroke sensor 3 and the preset target deceleration characteristics map. The integration controller 9 has the following information input to the integration controller: the battery charging capacity information from the battery controller 91, the wheel velocity information from the wheel velocity sensor 92, the brake operation information from the brake switch 93, the brake pedal stroke information from the stroke sensor 3, the master cylinder pressure information from the master cylinder pressure sensor 24, etc.

Block Configuration of the Regeneration Coordinated Brake Control

Figure 3:
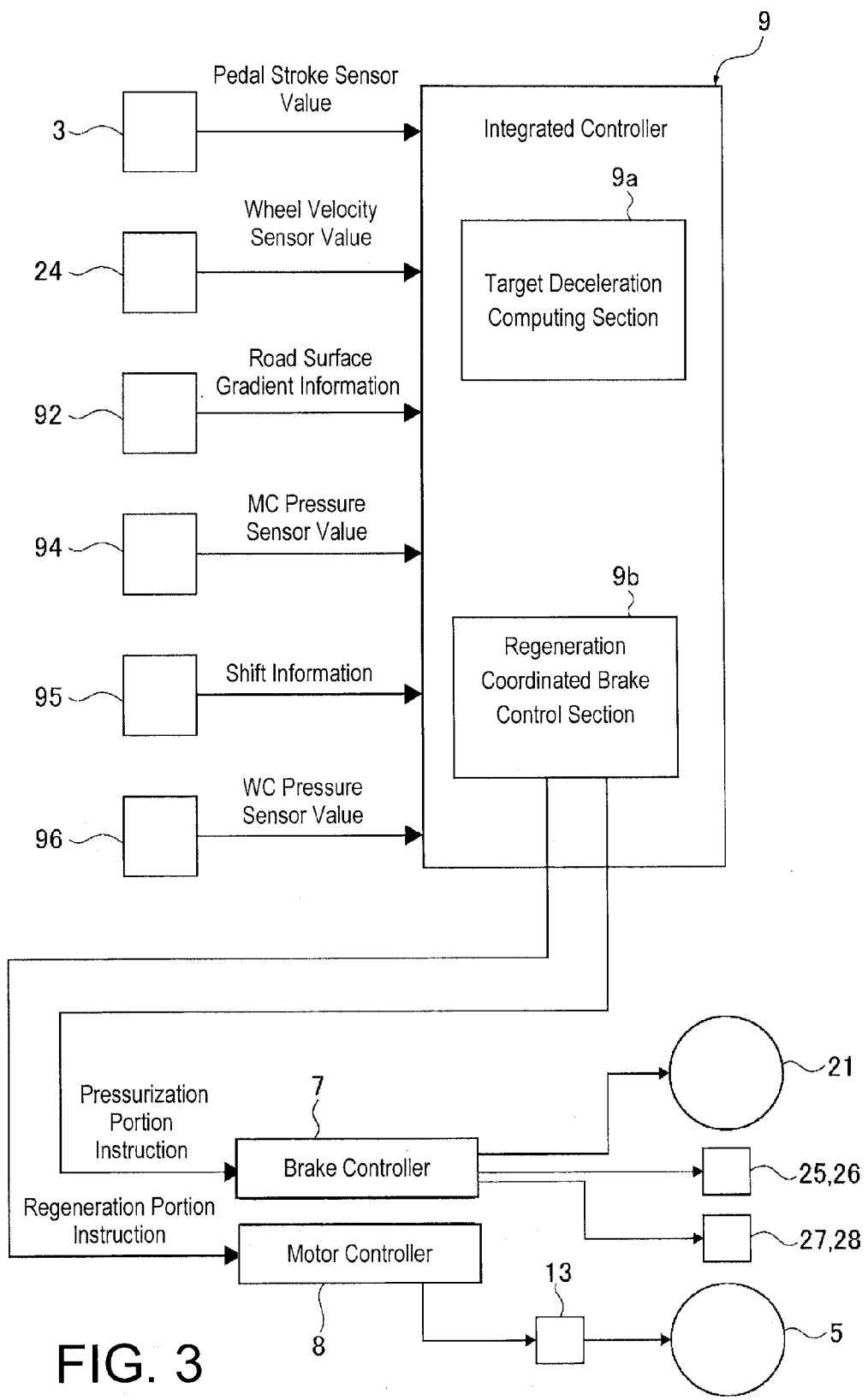
FIG. 3 is a control block diagram illustrating the regeneration the coordinated brake control system in the brake controller in Application Example 1.

FIG. 3 is a diagram illustrating the regeneration coordinated brake control system in the brake controller of Application Example 1. In the following, the block configuration of the regeneration coordinated brake control will be explained with reference to FIG. 3.

As shown in FIG. 3, the regeneration coordinated brake control system of Application Example 1 has a brake controller 7, a motor controller 8, and a integration controller 9.

The brake controller 7 has the pressurization portion instruction input to the brake controller from the integration controller 9, and the brake controller outputs the driving instructions to the VDC motor 21, the two cut solenoid valves 25 and 26, and the solenoid valves 27 and 28 of the VDC brake hydraulic actuator 2.

The motor controller 8 has the regeneration portion instruction input from the integration controller 9, and the motor controller outputs the regeneration instruction to the inverter 13 that controls the vehicle-driving electric motor 5.

The integration controller 9 has the following values input to the integration controller: the pedal stroke sensor value from the stroke sensor 3, the MC pressure sensor value from the master cylinder pressure sensor 24, and the wheel velocity sensor value from the wheel velocity sensor 92. In addition, the integration controller has the following formula information input to the integration controller: the road surface gradient information from the road surface gradient sensor 94, the shift information indicating the range position (the D range, the N range, the R range, etc.) selected from the shift position sensor 95, and the WC pressure sensor value from the wheel cylinder pressure sensor 96. Also, there is a computing stepping section that calculates a computation on the basis of this information. The computing stepping information has a target deceleration computing section 9a and a regeneration coordinated brake controller 9b.

The target deceleration computing section 9a computes the target deceleration (equal to the deceleration requested by the driver) on the basis of the target deceleration characteristics according to the target deceleration characteristics map and the pedal stroke sensor value from the stroke sensor 3.

The regeneration coordinated brake controller 9b has the target deceleration computed by the target deceleration computing section 9a, the MC pressure sensor value from the master cylinder pressure sensor 24 and the wheel velocity sensor value from the wheel velocity sensor 92 input to the regeneration coordinated brake controller. Then, the regeneration coordinated brake controller determines the basic hydraulic pressure portion on the basis of the MC pressure sensor value and the regeneration portion on the base of the wheel velocity sensor value, and the regeneration coordinated brake controller carries out the regeneration coordinated brake control computing operation with the insufficiency compensated by the pressurization portion in case when the insufficiency takes place so that the target deceleration is realized by a sum of the basic hydraulic pressure portion plus the regeneration portion, if possible. According to the obtained computed result, a regeneration portion instruction corresponding to the regeneration portion is output to the motor controller 8, and the pressurization portion instruction corresponding to the pressurization portion is output to the brake controller 7.

Configuration of the Treatment of the Regeneration Coordinated Brake Control

Figure 4:
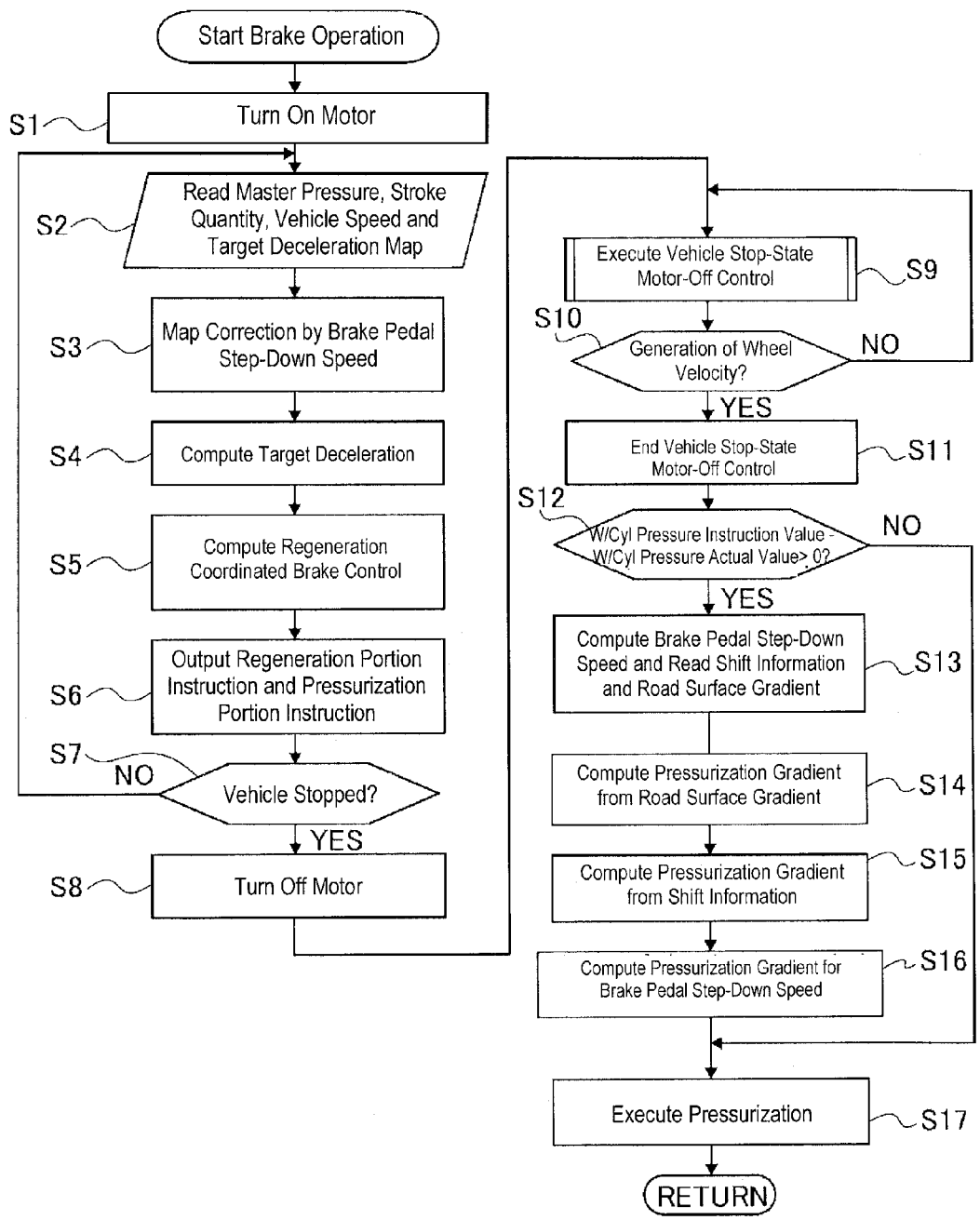
FIG. 4 is a flow chart illustrating the flow of the regeneration coordinated brake control treatment executed by the integration controller in the brake controller in Application Example 1.

FIG. 4 is a flow chart illustrating the flow of the regeneration coordinated brake control treatment executed by the integration controller 8 as the brake controller in Application Example 1. In the following, with reference to FIG. 4, the various steps of the operation indicating the configuration of the treatment of the regeneration coordinated brake control will be explained. Here, the regeneration coordinated brake control treatment starts at the time point when a determination has been made that the brake operation has been started and ends by the release of the brake operation.

In step S1, the VDC motor 21 that is in a stopped state is turned to the motor-on state before starting the brake operation, and then the operation goes to step S2.

In step S2, as the continuation of the determination of the motor-on in step S1 or the vehicle non-stop state in step S7, the master cylinder pressure information from the master cylinder pressure sensor 24, the pedal stroke quantity information from the stroke sensor 3, the wheel velocity information from the wheel velocity sensor 92, and the target deceleration characteristics map are read, and the operation goes to step S3.

In step S3, as a continuation of the operation of reading the necessary information and the target deceleration characteristics map in step S2, the brake pedal depressing speed is computed, and, from the pedal depressing speed, a correction of the target deceleration characteristics map is carried out, and the operation then goes to step S4.

Here, for example, the correction of the target deceleration characteristics map is carried out as follows: an offset correction is carried out by shifting in the stroke direction so that the higher that the brake pedal depressing speed computed in the above step is than the pedal depressing speed information, the shorter the loss stroke until the point of generation of the actual master cylinder pressure is. Also, when the pedal depressing speed information of the target deceleration characteristics map is in agreement with the computed pedal step-down speed, or when the differential speed is within the tolerance range, there is no need to carry out the correction for the preset target deceleration characteristics map.

In step S4, as a continuation of the correction of the target deceleration characteristics map by the pedal depressing speed in step S3, on the basis of the brake pedal stroke sensor value and the corrected target deceleration characteristics map, the target deceleration corresponding to the brake pedal stroke position by the driver input is computed, and the operation goes to step S5.

In step S5, as a continuation of computing the target deceleration in step S4, on the basis of the MC pressure sensor value in this case, the basic hydraulic pressure portion is determined; on the basis of the wheel velocity sensor value and the battery SOC, the maximum possible regeneration portion is determined. Then, a determination is made so that the residual deceleration portion obtained by subtracting the basic hydraulic pressure portion and the regeneration portion from the target deceleration is taken as the share provided by the pressurization portion. That is, residual deceleration portion carries out the regeneration coordinated brake control computation so that the target deceleration is realized by the sum of the target deceleration added to the basic hydraulic pressure portion plus the regeneration portion plus the pressurization portion, and then the operation goes to step S6.

In step S6, as a continuation of the regeneration coordinated brake control computation carried out in step S5, among the additional target brake force with respect to the basic hydraulic pressure portion, the regeneration portion instruction corresponding to the regeneration portion is determined, and the regeneration portion instruction (including the zero instruction) is output to the motor controller 8. At the same time, among the additional target brake force with respect to the basic hydraulic pressure portion, the pressurization portion instruction corresponding to the pressurization portion is determined, and the pressurization portion instruction (including the zero instruction) is output to the brake controller 7; the operation then goes to step S7.

Here, as the regeneration portion instruction is input to the motor controller 8, with the regeneration portion taken as the target regeneration brake force, the feed forward control is carried out for determining the regeneration current value to the vehicle-driving electric motor 5, so that the regeneration torque control is carried out. When the pressurization portion instruction is input to the brake controller 7, the brake controller takes the differential pressure as the target differential pressure, and, by the feed forward control that determines the operation current values to the two M/C cut solenoid valves 25 and 26, and the brake controller carries out the differential pressure control.

In step S7, as a continuation to the output of the regeneration portion instruction and the pressurization portion instruction in step S6, on the basis of the wheel velocity sensor value from the wheel velocity sensor 92, whether the vehicle has stopped is determined. If the determination result is YES (the vehicle stop state), the operation goes to step S8; if the determination result is NO (the vehicle not in stop state), the operation returns to step S2.

In step S8, as a continuation to the determination of the vehicle stop state in step S7, the motor driving of the VDC motor 21 is turned off, and the operation then goes to step S9.

In step S9, as a continuation to the determination of motor-OFF in step S8 or the determination of no generation of wheel velocity in step S10, the motor-OFF control when the vehicle is stop is executed, and the operation goes to step S10.

In step S10, as a continuation of execution of the motor-OFF control when the vehicle is stopped in step S9, on the basis of the wheel velocity sensor value from the wheel velocity sensor 92, a determination is made regarding whether the wheel velocity is generated. When the determination result is YES (the generation of the wheel velocity), the operation goes to step S11; when the determination result is NO (wheel velocity not generated), the operation returns to step S9.

In step S11, as a continuation of the determination of no generation of the wheel velocity (the vehicle stops) in step S10, the motor-OFF control that continues while the vehicle stops is ended, and the operation goes to step S12.

In step S12, as a continuation of the vehicle-stop-state motor-OFF control in step S11, a determination is made regarding whether the difference between the wheel cylinder pressure instruction value output from the brake controller 7 to the VDC brake hydraulic actuator 2 and the actual value of the wheel cylinder pressure on the basis of the WC pressure sensor value from the wheel cylinder pressure sensor 96 is over zero. If the determination result is YES (the w/cyl pressure instruction value is greater than the w/cyl pressure actual value), the operation goes to step S13; if the determination result is NO (the w/cyl pressure instruction value is less than or equal to the w/cyl pressure actual value), the operation goes to step S17.

Here, the wheel cylinder pressure instruction value is the instruction value output on the basis of the pedal stroke, and the wheel cylinder pressure instruction value corresponds to the target deceleration. On the other hand, the wheel cylinder pressure actual value is the brake hydraulic pressure sensor value that generates the deceleration of the vehicle, and the wheel cylinder pressure instruction value corresponds to the actual deceleration.

In step S13, as a continuation of the determination that the w/cyl pressure instruction value is greater than the w/cyl pressure actual value in step S12, the brake pedal stroke sensor value is differentiated with respect to the time necessary to compute the brake pedal depressing speed; at the same time, the brake pedal stroke sensor value reads the shift information from the shift position sensor 95 and the road surface gradient from the road surface gradient sensor 94, and then the operation goes to step S14.

In step S14, as a continuation of the computation of the brake pedal depressing speed and the read operation of the depressing quantity, the shift information and the road surface gradient before the release of the brake in step S13, the pressurization gradient as the slope of the pressurization characteristics of the wheel cylinder pressure is computed on the basis of the road surface gradient, and the operation then goes to step S15.

Here, the pressurization gradient on the basis of the road surface gradient is the gradient that is limited as different from the pressurization gradient (the pressurization characteristics C shown in FIG. 5) without any restriction, and the limit degree is changed by the following computing operation.

Figure 5:
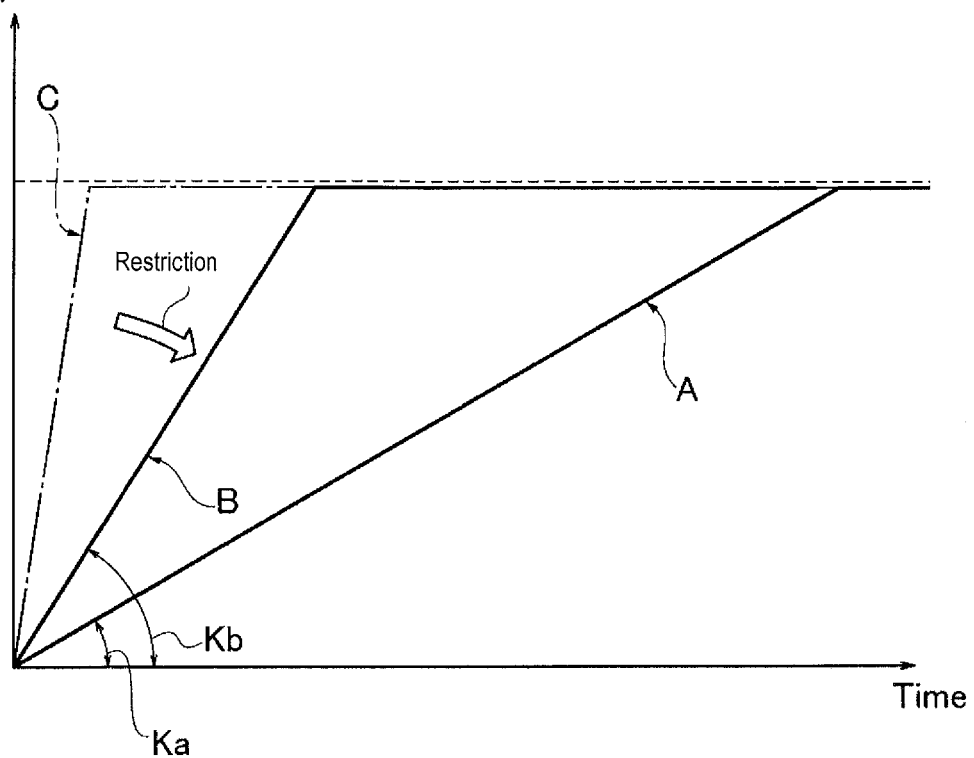
FIG. 5 is a pressurization characteristics diagram illustrating an example in which, on the basis of the road surface gradient, a restriction is made on the pressurization characteristics when a vehicle speed is generated in the regeneration coordinated brake control treatment executed by the integration controller in the brake controller in Application Example 1.

When a determination has been made that the higher the road surface gradient for the upward slope road or the downward slope road, the faster the brake by the driver is required, for example, as indicated by the arrow B in FIG. 5, and the pressurization gradient Kb of the pressurization characteristics is a steep gradient (the smaller gradient restriction).

On the other hand, when a determination has been made that the road surface gradient is near that of the flat road, the request for braking by the driver is not rushed, the pedal feeling is taken as the priority. For example, as indicated by the arrow A in FIG. 5, the pressurization gradient Ka of the pressurization characteristics is taken as the lower gradient (a higher gradient restriction).

In step S15, as a continuation of the computing of the pressurization gradient on the basis of the road surface gradient in step S14, on the basis of the shift information, the pressurization gradient is computed as the slope of the pressurization characteristics of the wheel cylinder pressure, and the operation then goes to step S16.

Here, the pressurization gradient on the basis of the shift information is taken as the gradient for the pressurization gradient free of any restriction (the pressurization characteristics C in FIG. 5). However, the road surface gradient and the shift position are correlated with each other, and the restriction degree is subject to the following change operation for the upward slope road and the downward slope road, respectively.

When the vehicle runs up a slope with the shift at the D range, a determination is made that the request for braking by the driver is not rushed, and the gradient is lower (the higher gradient restriction). On the other hand, when the vehicle runs up a slope with the shift at the N range or R range, a determination is made that the request for braking by the driver is more rushed than that at the D range, and the gradient is set as steep (the lower restriction on the gradient).

When the vehicle runs down a slope with shift at the R range, a determination is made that the request for braking by the driver is not rushed, the gradient is taken as a lower one (the higher restriction on the gradient). On the other hand, when the vehicle runs down a slope at the N range or D range, a determination is made that the request for braking by the driver is more rushed than that at the R range, and the gradient is taken as a high gradient (the low restriction on the gradient).

That is, in the computation of the pressurization gradient on the basis of the shift information, for example, in step S14, the pressurization gradient restricted on the basis of the road surface gradient is further changed to the higher gradient side or the lower gradient side on the basis of the shift information.

In step S16, as a continuation of the computation of the pressurization gradient on the basis of the information in step S15, on the basis of the brake pedal depressing speed computed in step S13, the pressurization gradient is computed as the inclination of the pressurization characteristics of the wheel cylinder pressure, and the operation goes to step S17.

Here, the pressurization gradient on the basis of the brake pedal depressing speed is taken as the restricted gradient with respect to the pressurization gradient (the pressurization characteristics C shown in FIG. 5) free of any restriction. However, when the brake pedal depressing speed is faster, the restriction is changed so that the pressurization gradient becomes the high gradient side.

In the computation of the pressurization gradient on the basis of the brake pedal depressing speed, for example, in step S15, the pressurization gradient restricted on the basis of the shift information is then changed to the higher gradient side on the basis of the brake pedal step-down speed.

In step S17, as a continuation of the computation of the pressurization gradient on the basis of the brake pedal depressing speed in step S16 or the determination that the w/cyl pressure instruction value is less than or equal to the w/cyl pressure actual value in step S12, the pressurization of the wheel cylinder pressure is carried out, and then the operation goes to return.

Here, when the w/cyl pressure instruction value is greater than or equal to the w/cyl pressure actual value, the pressurization of the wheel cylinder pressure is executed to track the pressurization gradient restricted by the computation.

In the following, the operations will be explained.

The operations of the brake controller of the hybrid vehicle in Application Example 1 are divided into the following operations to be explained respectively: the "regeneration coordinated brake control operation," the "vehicle-stop-state motor-OFF control operation," the "topic at end of vehicle-stop-state motor-OFF control," and the "pressurization gradient suppression operation at the end of the vehicle-stop-state motor-OFF control."

Regeneration Coordinated Brake Control Operation

For the hybrid vehicle, when braking, the brake energy is not entirely consumed as the thermal energy as an engine vehicle; among the brake energy, as much of the energy should be recovered as the regeneration energy by the battery so that the fuel mileage can be increased. In the following, the regeneration coordinated brake control operation in this case will be explained.

For the existing conventional VDC, when the brake operation is carried out, the target deceleration demanded by the driver can be obtained with the basic hydraulic pressure portion by the negative pressure booster. On the other hand, a regeneration gap of the target deceleration is offset from the target deceleration requested by the driver so that the basic hydraulic pressure portion by the negative pressure booster in the brake operation does not reach the target deceleration. As a result, by setting the regeneration gap at the maximum regeneration torque, the regeneration gap portion of the target deceleration becomes insufficient with respect to the target deceleration requested by the driver. Consequently, when the maximum regeneration torque is generated, the driver requested target deceleration is realized by the negative pressure booster (the basic hydraulic pressure portion) and the regeneration brake (the regeneration portion), and the regeneration function can be displayed to the upper limit.

Figure 6:
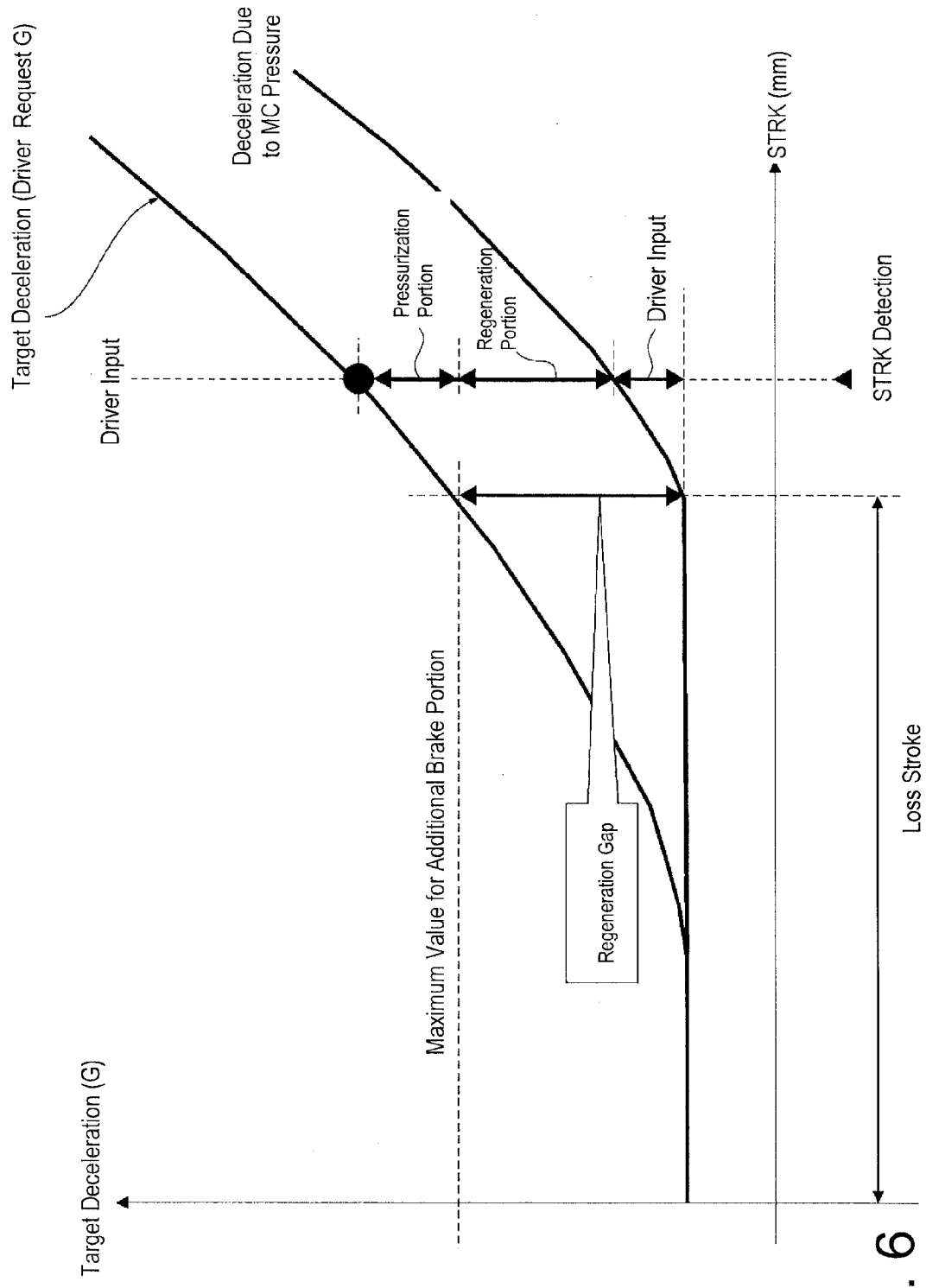
FIG. 6 is a diagram illustrating the concept of control in an example of the deceleration sharing relationship with respect to the driver input by the regeneration coordinated brake control for realizing the target deceleration (equal to the deceleration requested by the driver) by the sum of the basic hydraulic pressure portion, the regeneration portion and the pressurization portion by the regeneration coordinated brake control system using the VDC.

However, depending on the wheel velocity condition, the battery charging condition, etc., even when the target deceleration insufficient for the basic hydraulic pressure portion is compensated by only the regeneration portion with respect to the target deceleration requested by the driver, compensation may be impossible to be carried out. Here, as shown in FIG. 6, there is a regeneration coordinated brake control system that uses the VDC for compensating the insufficient portion by the VDC brake hydraulic pressure actuator (the pressurization portion) so that the sum of the negative pressure booster (the basic hydraulic pressure portion) and the regeneration brake (the regeneration portion) can realize the target deceleration requested by the driver.

Consequently, for the existing conventional VDC, by simply changing the characteristics of the negative pressure booster, changing the characteristics of the VDC brake hydraulic pressure actuator, and adding the stroke sensor, it is possible to configure an inexpensive regeneration coordinated brake control system using the VDC.

That is, the regeneration coordinated brake control system using the VDC is a control system that works as follows: for the target deceleration, in the case when the basic hydraulic pressure portion and the regeneration portion alone cannot make the compensation, the hydraulic pressure of the portion that cannot be compensated by the VDC brake hydraulic actuator 2 is boosted to realize the deceleration requested by the driver. In other words, the regeneration coordinated brake control system is a control system that can extend the safety function of the conventional VDC (the safety function plus the regeneration coordinating function).

For the hybrid vehicle carrying the regeneration coordinated brake control system that is running, if the brake operation is carried out, in the flow chart shown in FIG. 4, the operation is carried out in the following order: step S1→step S2→step S3→step S4→step S5→step S6→step S7. Then, in step S7, during the period when a determination has been made that the vehicle is not in the stop state, the following flow of the operation is repeated: step S2→step S3→step S4→step S5→step S6→step S7, and the regeneration coordinated brake control is executed. Then, in step S7, when a determination has been made that the vehicle is in the stop state, the operation goes from step S7 to step S8, and the regeneration coordinated brake control comes to an end.

That is, in step S4, on the basis of the brake pedal stroke sensor value and the preset or corrected target deceleration characteristics map, the target deceleration corresponding to the brake pedal stroke position is computed from the driver input. In step S5, in this case, on the basis of the MC pressure sensor value, the basic hydraulic pressure portion is determined; on the basis of the wheel velocity sensor value and the battery SOC, the maximum available regeneration portion is determined. Then, the residual deceleration portion obtained by subtracting the basic hydraulic pressure portion and the regeneration portion from the target deceleration is taken as the pressurization portion as a share. In step S6, among the additional target brake force with respect to the basic hydraulic pressure portion, the regeneration portion instruction value is determined, and the regeneration portion instruction (including the zero instruction) is output to the motor controller 8. At the same time, among the additional target brake force with respect to the basic hydraulic pressure portion, the pressurization portion instruction value corresponding to the pressurization portion is determined, and the pressurization portion instruction (including the zero instruction) is output to the brake controller 7.

Consequently, in the regeneration coordinated brake control operation, for the motor controller 8 having the regeneration portion instruction input to the motor controller, the regeneration portion is taken as the target regeneration brake force; by the feed forward control that determines the regeneration current value to the vehicle-driving electric motor 5, the regeneration torque control is carried out. Then, in the brake controller 7 having the pressurization portion instruction input to the brake controller, the pressurization portion is taken as the target differential pressure; by the feed forward control that determines the rotation increase instruction to the VDC motor 21 and the operation current values for the two M/C cut solenoid valves 25 and 26, the differential pressure control is carried out. As a result, among the brake energy, it is possible to recover the maximum possible regeneration energy portion to the battery carried on the vehicle.

Vehicle-stop-state Motor-OFF Control Operation

In the regeneration coordinated brake control, in order to carry out the pump-up pressurization, the VDC motor 21 should be kept on. Consequently, the durability of the VDC motor 21 becomes a problem. Here, when the brake operation is carried out to slow or stop the vehicle, the VDC motor 21 should be stopped under a prescribed condition, and guaranteeing the durability of the VDC motor 21 is necessary. In the following, the vehicle-stop-state motor-OFF control operation for this purpose will be explained.

In step S7 shown in FIG. 4, when the vehicle stop state is determined, the VDC motor 21 is turned off, and the vehicle-stop-state motor-OFF control starts. Then, in step S10 shown in FIG. 4, as the wheel velocity is generated, the vehicle-stop-state motor-OFF control ends. That is, while the vehicle stops, a control is carried out so that the VDC motor 21 is kept off.

In the following, an example of the vehicle-stop-state motor-OFF control will be explained. When the vehicle speed becomes 0 km/h, the motor stop flag is turned from off to on, and a decrease of the motor rotation velocity of the VDC motor 21 starts. Then, when the motor rotation velocity of the VDC motor 21 becomes zero (the motor stops), and, as the brake pedal depressing quantity is maintained, during this period, the wheel cylinder pressure as the sum of the master cylinder pressure and prescribed valve differential pressure is maintained.

Then, when the brake pedal depressing operation is started, the master cylinder pressure increases the tracking of the depressing operation. However, the wheel cylinder pressure cannot be pump-up pressurized due to the stopping of the VDC motor 21, and the wheel cylinder pressure is kept as that when the depressing operation starts. That is, in the depressing mode, the instruction pressure (the target pressure difference) to the cut solenoid valves 25 and 26 is decreased, and the valve pressure difference decreases in a reciprocal proportion to increase in the master cylinder pressure. As the decreased valve pressure difference is added to the increased master cylinder pressure, the wheel cylinder pressure is maintained constant. Here, as the pedal depressing quantity is maintained at the depressing position, the constant master cylinder pressure at the raised position and the constant valve pressure difference at the lowered position are added, and the wheel cylinder pressure is maintained constant. In addition, after starting the brake pedal releasing operation, by maintaining the valve differential pressure as is, the master cylinder pressure and the wheel cylinder pressure decrease the tracking of the pedal releasing operation. Consequently, as the pedal depressing quantity (the master cylinder pressure) is maintained, the wheel cylinder pressure and the valve differential pressure decrease.

Then, as the operation of the foot leaving the brake pedal starts, the valve differential pressure is kept at is, so that the master cylinder pressure and the wheel cylinder pressure decrease tracking the operation that the foot leaves the brake pedal; at the position of the foot leaving the pedal, the pedal depressing quantity is maintained, so that at the lower position, a prescribed master cylinder pressure and a prescribed valve differential pressure are added to maintain the wheel cylinder pressure. Then, when the operation of the foot being reset on the brake pedal starts, the master cylinder pressure rises, and the valve differential pressure decreases, so that the wheel cylinder pressure is maintained. Consequently, as the pedal depressing quantity (the master cylinder pressure) is maintained, the wheel cylinder pressure and the valve differential pressure decrease.

Then, when the brake pedal step-down operation is started again, the master cylinder pressure increases the tracking of the brake pedal depressing operation, and the valve differential pressure decreases to zero. Consequently, the master cylinder pressure becomes in agreement with the wheel cylinder pressure. That is, the differential pressure between the master cylinder pressure and the wheel cylinder pressure disappears, and the wheel cylinder pressure increases the tracking increase in the master cylinder pressure. After that, the wheel cylinder pressure is maintained, and the tracking maintenance and the master cylinder pressure are decreased. Then, the valve differential pressure between the master cylinder pressure and the wheel cylinder pressure entirely becomes zero. In this way, in the vehicle-stop-state motor-OFF control, as the driver steps down on the brake pedal, a control is carried out so that the target differential pressure is decreased while the target differential pressure between the master cylinder pressure and the wheel cylinder pressure is not maintained.

The reason is as follows. First of all, when the driver steps down on the brake pedal, as the target differential pressure between the master cylinder pressure and the wheel cylinder pressure is maintained, the VDC motor 21 is turned on, and carrying out pump-up pressurization tracking the wheel cylinder pressure and the master cylinder pressure as the VDC motor 21 is turned on is necessary. Secondly, when the driver steps down on the brake pedal while the cut solenoid valves 25 and 26 are in a closed state so that the target differential pressure between the master cylinder pressure and the wheel cylinder pressure is maintained, the so-called pedal stepping feeling takes place due to the high pedal reactive force. Consequently, when the driver steps on down the brake pedal during the vehicle-stop-state motor-OFF control, between the master cylinder pressure and the wheel cylinder pressure, the state makes a transition from the target differential pressure to the state with no target differential pressure.

Topic at the End of Vehicle-stop-state Motor-OFF Control

In the following, the topic of a comparative example will be explained with reference to FIG. 7. According to this comparative example, the target differential pressure is in the low state during the vehicle-stop-state motor-OFF control; when a vehicle speed is increased, the vehicle-stop-state motor-OFF control ends, and, due to the differential pressure control and the pump-up pressurization, the wheel cylinder pressure increases.

Figure 7:
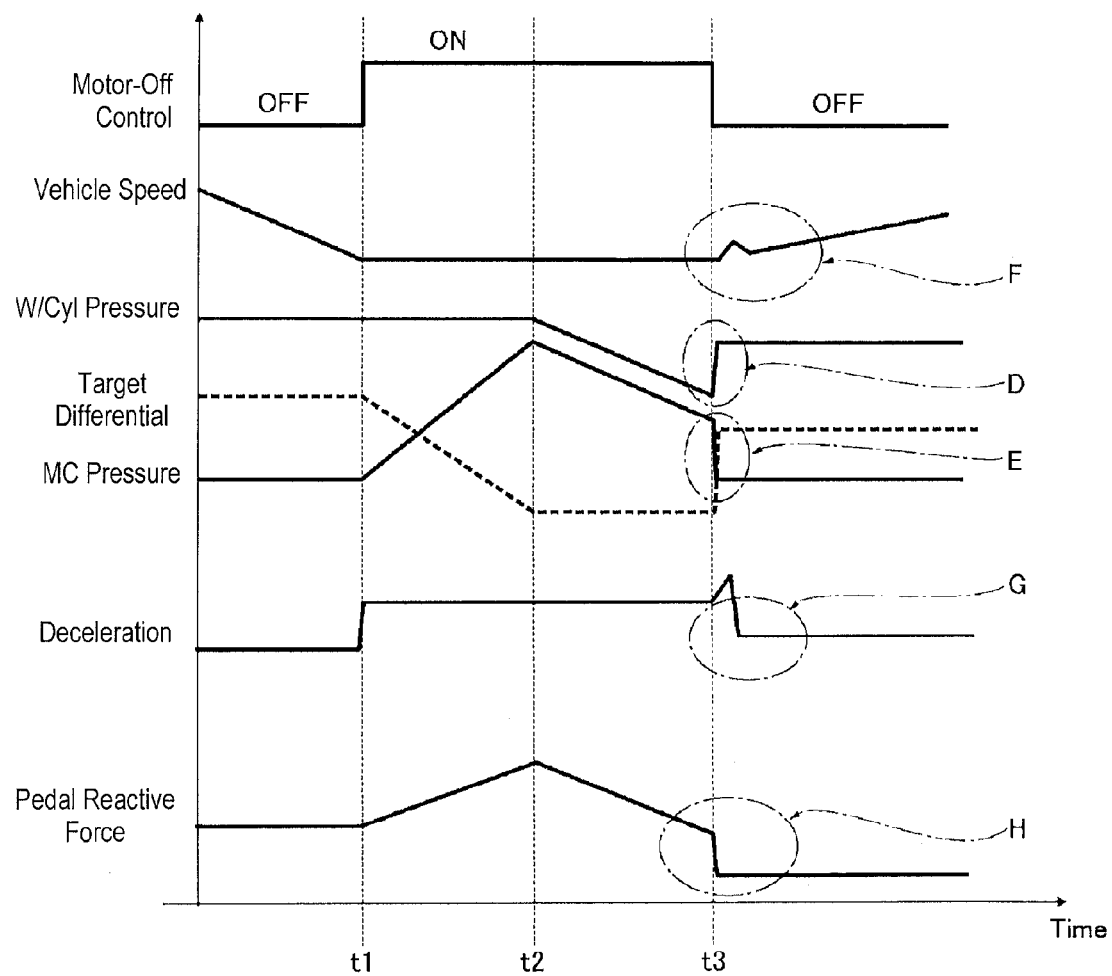
FIG. 7 is a time chart illustrating the various characteristics of the motor-OFF control, the vehicle speed, the wheel cylinder pressure, the target differential pressure, the master cylinder pressure, the deceleration, and the pedal reactive force as topics when the pedal depressing operation is carried out during the vehicle-stop-state motor-OFF control when a vehicle speed is generated for the vehicle having the brake controller in a comparative example.

As shown in FIG. 7, at time t1, the vehicle speed and the deceleration become zero, and the vehicle-stop-state motor-OFF control starts. At time point t2, the brake pedal depressing operation during the vehicle-stop-state motor-OFF control from time t1 ends. At time t3, a vehicle speed is generated due to the pedal releasing operation (the pedal release operation) from the time point t2, and the vehicle-stop-state motor-OFF control ends.

During the period from time t1 to time t2, in company with the brake pedal depressing operation in the vehicle-stop-state motor-OFF control, the master cylinder pressure increases. However, as the target differential pressure decreases, a constant wheel cylinder pressure is maintained. In addition, during the period from time t1 to time t2, the pedal reactive force increases as the master cylinder pressure increases.

On the other hand, in the period from time t2 to time t3, in company with the pedal releasing operation in the vehicle-stop-state motor-OFF control, the master cylinder pressure and the wheel cylinder pressure decrease; for the target differential pressure, the differential pressure after the decrease is maintained. In addition, in the period from time t2 to time t3, the pedal reactive force decreases in company with the decrease in the master cylinder pressure.

At time t3, due to acceleration, the vehicle-stop-state motor-OFF control ends. As a result, the differential pressure valve control is carried out so that the decreased target differential pressure is increased instantly, and, as the pump motor is turned on again, the pump-up pressurization is carried out. Consequently, right after the pump motor is turned on again, as indicated by the arrow D in FIG. 7, the wheel cylinder pressure rises at a high gradient; due to the inward suction of the brake fluid in company with the pump-up pressurization operation, as indicated by the arrow E in FIG. 7, the master cylinder pressure decreases at a high gradient.

As a result, because the wheel cylinder pressure increases at a high gradient, as indicated by the arrow F shown in FIG. 7, the vehicle speed changes from the acceleration state to the deceleration state from time t3; as indicated by the arrow G shown in FIG. 7, the deceleration takes place as the acceleration side changes to the deceleration side at time t3. As a result, the driver gets an uncomfortable deceleration feeling.

In addition, as the master cylinder pressure decreases at a high gradient, as indicated by the arrow H shown in FIG. 7, the pedal reactive force decreases drastically from time t3, and the driver gets an uncomfortable pedal feeling.

The Pressurization Gradient Suppression Operation at the End of the Vehicle-stop-state Motor-OFF Control As explained above, when the brake pedal depressing operation is carried out during the vehicle-stop-state motor-OFF control, when a vehicle speed is generated, an uncomfortable deceleration feeling and an uncomfortable pedal feeling take place. Consequently, suppressing such an uncomfortable deceleration feeling and the uncomfortable pedal feeling becomes necessary. In the following, with reference to FIG. 8, the operation for suppressing the pressurization gradient at the end of the vehicle-stop-state motor-OFF control will be explained.

First of all, even when vehicle-stop-state motor-OFF control starts, during the period when a determination is made that the wheel velocity is not generated in step S10, according to the flow chart shown in FIG. 4, the following operation flow is carried out repeatedly: step S9→step S10, and the vehicle-stop-state motor-OFF control continues. Then, when a determination is made that a wheel velocity is generated in step S10, as shown in the flow chart of FIG. 4, the operation goes from step S10 to step S11, the vehicle-stop-state motor-OFF control ends, and the operation goes from step S11 to step S12. In step S12, a determination is made regarding whether the w/cyl pressure instruction value output from the brake controller 7 to the VDC brake hydraulic actuator 2 is over the w/cyl pressure actual value on the basis of the WC pressure sensor value from the wheel cylinder pressure sensor 96. Then, if a determination is made that the w/cyl pressure instruction value is less than or equal to the w/cyl pressure actual value, as the target deceleration is in agreement with the actual deceleration, or the actual deceleration is higher than the target deceleration, there is no need to increase the wheel cylinder pressure, so that the operation goes to step S17. On the other hand, if a determination has been made that w/cyl pressure instruction value is greater than the w/cyl pressure actual value, as the actual deceleration is lower than the target deceleration, increasing the wheel cylinder pressure becomes necessary so that the actual deceleration becomes in agreement with the target deceleration. Consequently, the operation goes to step S13 and thereafter.

In step S12, if a judgment is made that w/cyl pressure instruction value is greater than the w/cyl pressure actual value, according to the flow chart shown in FIG. 4, the operation goes through the following steps from step S12: S13→step S14→step S15→step S16→step S17→Return. In step S13, while the brake pedal depressing speed is computed as the information that determines the restriction on the pressurization gradient, the shift information and the road surface gradient are read. In step S14, on the basis of the road surface gradient, the pressurization gradient as the inclination of the pressurization characteristics of the wheel cylinder pressure is computed. In step S15, on the basis of the shift information, the pressurization gradient as the inclination of the pressurization characteristics of the wheel cylinder pressure is computed. In step S16, the pressurization gradient as the pressurization characteristics of the wheel cylinder pressure on the basis of the brake pedal depressing speed is computed.

That is, at end of the vehicle-stop-state motor-OFF control, due to the decrease in the wheel cylinder pressure, when a determination has been made that the w/cyl pressure instruction value is greater than the w/cyl pressure actual value, in step S12 to step S16, the pressurization gradient restricting section restricts the pressurization gradient. The restriction of the pressurization gradient refers to the restriction carried out under the pressurization instruction sent to the VDC brake hydraulic actuator 2 that increases the wheel cylinder pressure so that the pressurization gradient of the pressurization characteristics (the slope and the gain of the characteristics) becomes lower than the pressurization gradient when there is no such restriction.

Figure 8:
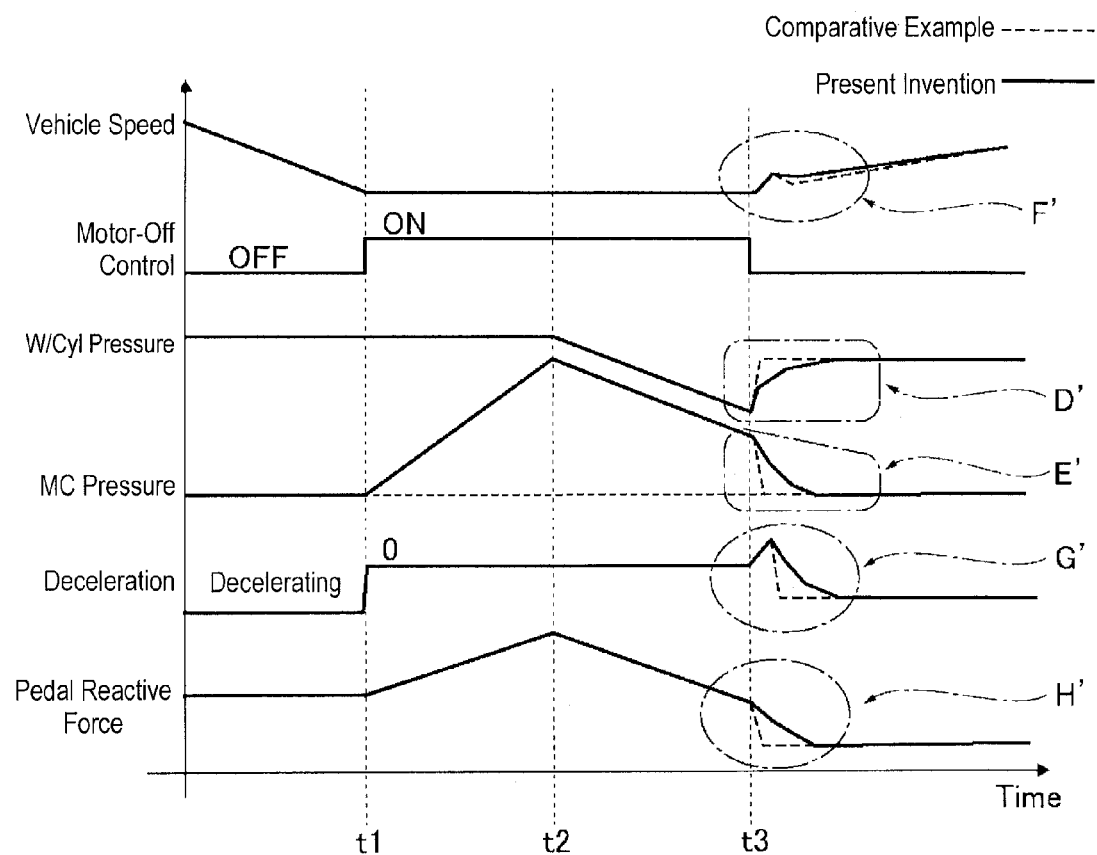
FIG. 8 is a time chart illustrating the various characteristics of the vehicle speed, the motor-OFF control, the wheel cylinder pressure, the target differential pressure, the master cylinder pressure, the deceleration, and the pedal reactive force illustrating the pressurization gradient restriction effect when a vehicle speed is generated for the vehicle having the brake controller of Application Example 1.

Consequently, at time t3 as shown in FIG. 8, when the vehicle-stop-state motor-OFF control ends due to the acceleration, the differential pressure valve control that gradually increases the target differential pressure that has been decreased, and the pump-up pressurization that gradually increases the rotation velocity of the VDC motor 21 are carried out. Right after the VDC motor 21 is turned on again, as indicated by the arrow D' shown in FIG. 8, the wheel cylinder pressure increases at a lower gradient. Then, the lower pump-up pressurization suppresses the rapid suction of the brake fluid; as indicated by the arrow E' shown in FIG. 8, the master cylinder pressure decreases at a lower gradient.

In this way, because the wheel cylinder pressure increases at a lower gradient, as indicated by the arrow F' in FIG. 8, the vehicle speed is decelerated at time t3 from the acceleration to the deceleration at a lower gradient of the decrease. Then, as indicated by the arrow G' in FIG. 8, at time t3, deceleration takes place, so that the vehicle speed changes from the acceleration side to the deceleration side at a lower gradient. As a result, it is possible to suppress the odd deceleration feeling of the driver. In addition, as the master cylinder pressure decreases at a lower gradient, as indicated by the arrow H', from time t3, the pedal reactive force decreases smoothly, and thus suppressing the odd pedal feeling of the driver becomes possible.

In the following, the operation of the change in the pressurization gradient that has the restriction degree of the pressurization gradient changed will be explained with respect to the following operations, respectively: (a) the operation of the change of the pressurization gradient on the basis of the road surface gradient, (b) the operation of the change of the pressurization gradient on the basis of the shift information, and (c) the operation of the change of the pressurization gradient on the basis of the brake pedal depressing speed.

(a) The Operation of the Change of the Pressurization Gradient on the Basis of the Road Surface Gradient The pressurization gradient on the basis of the road surface gradient has a higher gradient with a lower gradient restriction when the road surface gradient is higher. On the other hand, the flatter the road for the road surface gradient is, the higher the gradient restriction and the lower the gradient will be. For example, when the road surface gradient is higher, as can be seen from the pressurization characteristics B shown in FIG. 5, the pressurization gradient Kb is higher. When the road is flat, as can be seen from the pressurization characteristics A shown in FIG. 5, the pressurization gradient Ka (<Kb) is lowered (using a "lower responsiveness control" that is the slowest).

That is, when the vehicle stops on an upward sloped road, due to the decrease in the brake force, a backwards slipping of the vehicle takes place. However, when a vehicle speed is generated due to such a backwards slipping movement, if the pressurization of the wheel cylinder pressure is slow, the vehicle allows such a backwards slipping movement to occur. When the vehicle is on a downward sloped road, a decrease in the brake force leads to the generation of a surge forward movement of the vehicle. However, when a vehicle speed is generated due to such a surge forward movement, if the pressurization of the wheel cylinder pressure is slow, the vehicle allows such a surge forward movement to occur.

Consequently, when the vehicle stops on an upward sloped road or a downward sloped road, if a high road surface gradient is displayed, on the basis of the determination that the driver has a rush request for braking, the pressurization gradient on the basis of the road surface gradient is taken as a high gradient. As a result, when the vehicle stops on an upward slope road, it is possible to prevent the vehicle from slipping backwards; when the vehicle stops on a downward slope road, preventing the vehicle from rushing forward becomes possible. That is, when the vehicle stops on a sloped road, corresponding to the rush request of the driver on the brakes, there is no delay in the pressurization of the wheel cylinder pressure.

On the other hand, when the vehicle stops on the flat road and when the road surface gradient is nearly that of a flat road, there is no rush request of the driver on brakes; on the basis of the determination that the pedal feeling is the priority, the pressurization gradient on the basis of the road surface gradient is taken as a low gradient, and the odd deceleration feeling and the odd pedal feeling can be suppressed to a low level.

(b) The Operation of the Change of the Pressurization Gradient on the Basis of the Shift Information The pressurization gradient on the basis of the shift information is set for the case of an upward sloped road and the case of a downward sloped road, respectively.

First of all, when the vehicle runs on an upward sloped road at the D range, a determination is made that the driver has a rush request for braking, the gradient restriction is made higher, and the gradient is taken as lower. On the other hand, when the vehicle runs on an upward sloped road at the N range or R range, a determination is made that the driver has a request for braking quicker than that at the D range, so that the gradient restriction is made lower and the gradient is taken as higher.

Also, when the vehicle runs on a downward sloped road at the R range, a determination is made that the driver has a rush request for braking, so that the gradient restriction is made higher, and the gradient is taken as lower.

In this way, by determining the pressurization gradient on the basis of the shift information, the fact that the vehicle moves and a vehicle speed is generated is detected. In this case, by a combination of the road surface gradient and the shifting operation, it is possible to provide a brake force corresponding to the rush request of the driver on braking.

For example, when the shift position is set at the D range when the vehicle stops on an upward sloped road, a drive force is generated in the forward direction of the vehicle, that is, in the direction opposite to the backwards slipping movement direction (the back moving direction) of the vehicle. Consequently, a determination is made that the request of the driver on the brakes in this state is more rushed than that of the N range or the R range. When the vehicle is at the N range or R range, no reactive force is generated with respect to the backwards slipping movement of the vehicle. As a result, when a determination is made that the request of the driver is more rushed than that at the D range, the pressurization gradient is set higher, so that a deceleration matching the rush request of the driver on the brake force is provided.

On the other hand, when the vehicle stops on a downward sloped road while the shift position is at the R range, a drive force is generated in the backward direction for the vehicle in the direction opposite to the slipping direction (the forward direction) of the vehicle. Consequently, a determination is made that the driver does not have a rush request for braking as that at the D range when the vehicle stops on an upward sloped road. If the vehicle is at the N range or D range, the reactive force with respect to the backwards slipping of the vehicle is not generated, so that a determination is made that the driver has a more rushed request for braking than that at the R range, and the pressurization gradient is set higher.

(c) The Operation of the Change in the Pressurization Gradient on the Basis of the Brake Pedal Depressing Speed.

For the pressurization gradient on the basis of the brake pedal depressing speed, the higher that the brake pedal depressing speed is, the lower the gradient restriction will be, and the higher the gradient will be. That is, the brake pedal depressing speed represents the request of the driver on the brake force, and the request of the driver on the brake force is reflected on the pressurization gradient. Consequently, when the brake pedal depressing speed is high, a determination is made that the request of the driver on the brakes is rushed, and the pressurization gradient is set on the higher gradient side. As a result, the request of the driver on the brakes is reflected on the pressurization characteristics; while the odd deceleration feeling and the odd pedal feeling are suppressed, the quick generation of the required deceleration is guaranteed.

On the other hand, when the brake pedal depressing speed is low, a determination is made that the request of the driver on the brakes is less rushed, and the pressurization gradient is set on the lower gradient side. As a result, the suppression of the odd deceleration feeling and the odd pedal feeling of the driver is reflected on the pressurization characteristics, and it is possible to suppress the odd deceleration feeling and the odd pedal feeling to a low level.

In this way, by changing the pressurization gradient on the basis of the brake pedal depressing speed, it is possible to provide a deceleration in consideration of not only the running environment (the road surface gradient) and the driving state (the shift position) but also the intention of the driver on braking.

In the following, the effect will be explained.

According to the brake controller of the hybrid vehicle in Application Example 1, the following listed effects can be realized.

(1) The brake controller has a master cylinder 13 that generates the master cylinder pressure corresponding to the brake operation; wheel cylinders 4FL, 4FR, 4RL and 4RR, which are arranged at the front/rear wheels, respectively, and have the hydraulic brake forces applied on them corresponding to the wheel cylinder pressures; brake hydraulic actuators (the VDC brake hydraulic actuators 2), which are installed between the master cylinder 13 and the wheel cylinders 4FL, 4FR, 4RL and 4RR, respectively, and which have hydraulic pumps 22 and 22 driven by a pump motor (the VDC motor 21) and differential pressure valves that control the differential pressure between the wheel cylinder pressure and the master cylinder pressure (the first M/C-cut solenoid valve 25 and second M/C-cut solenoid valve 26); a vehicle-stop-state motor-OFF controller (step S9), which stops the pump motor (the VDC motor 21) when the vehicle stops by the brake operation, and which maintains the stop state as is for the pump motor (the VDC motor 21) while the vehicle stops; and a pressurization speed controller (step S12 to step S16) that works as follows: when the vehicle-stop-state motor-OFF control ends due to acceleration from the vehicle stop state, in company with turning on again the pump motor (the VDC motor 21), the pressurization speed of the wheel cylinder pressure is higher when the road surface gradient is higher. Consequently, while the durability of the pump motor (the VDC motor 21) when the vehicle stops is guaranteed, it is possible to suppress the odd deceleration feeling and the odd pedal feeling when a vehicle speed is generated from the vehicle stop state. In addition, when the vehicle speed is generated from the stopped state of the vehicle on an upward sloped road, preventing the backwards slipping of the vehicle is possible; when a vehicle speed is generated from the stopped state of the vehicle on a downward sloped road, preventing the rush forward of the vehicle is possible.

(2) The pressurization speed controller described above is a pressurization gradient controller (step S12 to step S16) that restricts the gradient to have a lower gradient and, at the same time, changes the restriction so that the pressurization gradient is on the higher gradient side when the road surface gradient is higher. As a result, in addition to the effect (1) described above, it is also possible to realize the following effect: By changing the restriction of the pressurization gradient, in company with turning on the pump motor (the VDC motor 21) again, the pressurization speed is increased when the road surface gradient is higher.

(3) When a determination has been made that the road surface gradient is that of a flat road, the pressurization gradient restriction section (step S12 to step S16) changes the restriction so that the pressurization gradient becomes the lower gradient side than that when a determination has been made that the road surface gradient is determined to be a slope road (step S14). Consequently, in addition to the effect (2), when the vehicle stops on a flat road free of the backwards slipping or rushing forward of the vehicle, it is also possible to have the pedal feeling as the priority and to suppress the odd deceleration feeling and the odd pedal feeling.

(4) The pressurization gradient restriction section (step S12 to step S16) changes the restriction so that the pressurization gradient becomes the higher gradient side (step S15) when the direction of the drive force generated corresponding to the selected shift position is opposite to the direction of the force generated on the vehicle due to the road surface gradient (the shift is at the D range on an upward sloped road and at the R range on a downward sloped road), when the restriction is changed so that the pressurization gradient is on the lower gradient side and the shift position the (N range) without the generation of the drive force is selected, or when the direction of the drive force generated corresponding to the selected shift position is the same as the direction of the force generated on the vehicle due to the road surface gradient (the shift is at the R range on an upward sloped road and at the D range on a downward sloped road). Consequently, in addition to the effects (2) and (3) described above, when the vehicle moves on, the pressurization gradient is set to match the rush degree of the request of the driver on braking, it is possible to provide a brake force corresponding to the degree of rushing as the driver steps on the brakes.

(5) The brake controller has a pedal depressing speed computing section (step S13) that computes the brake pedal depressing speed by the driver when a vehicle speed is generated from the vehicle stop state. The pressurization gradient restriction section (step S12 to step S16) changes the restriction so that the pressurization gradient becomes the higher gradient side when the brake pedal depressing speed is faster (step S16). Consequently, in addition to the effects (2) to (4) described above, it is possible to provide a brake force corresponding to the request of the driver on the brake force displayed in the brake pedal depressing operation.

[In the above, the vehicle brake controller of the present invention has been explained with reference to Application Example 1. However, the specific configuration of the present invention is not limited to Application Example 1. As long as the spirit of the present invention related to the various claims is observed, changes and additions to the design are allowed.

According to Application Example 1, at the end of the vehicle-stop-state motor-OFF control due to acceleration, the pressurization gradient is computed on the basis of the road surface gradient, the pressurization gradient is computed on the basis of the shift information, and the pressurization gradient is computed on the basis of the brake pedal depressing speed. However, this is merely an example. One may also adopt a scheme in which the road surface gradient (equal to the gain) changes the increase rate limiter, or a map set corresponding to each scene is taken as a substitution. In addition, the scenes may have no steps by map supplementation instead of being classified to steps, such as 2 or 3 steps.

According to Application Example 1, for the pressurization gradient restriction section, when a determination is made that the w/cyl pressure instruction value is smaller than the w/cyl pressure actual value, a restriction is made on the basis of the road surface gradient, the shift information, or the brake pedal depressing speed. However, this is merely an example. One may also adopt a scheme in which when a vehicle speed is generated, as a difference takes place between the target deceleration and the actual deceleration, and pressurization by the brake hydraulic actuator is needed, as the restriction of the pressurization gradient is changed only by the road surface gradient.

According to Application Example 1, the roads with gradients are divided into an upward sloped road and a downward sloped road, and, for each of them, in combination with the shift information, the restriction of the pressurization gradient is changed. However, this is merely an example. One may also adopt a scheme in which the roads are divided into a sloped road with a higher road surface gradient and a flat road with a lower road surface gradient, and, for each of them, the restriction of the pressurization gradient is changed.

According to Application Example 1, as the brake hydraulic actuator, the VDC brake hydraulic actuator 2 shown in FIG. 2 is adopted. However, this is merely an example. One may also adopt a scheme in which the brake hydraulic actuator has a hydraulic pump driven by a pump motor and a differential pressure valve that controls the differential pressure between the wheel cylinder pressure and the master cylinder pressure.

According to Application Example 1, the brake controller of the present invention is adopted on a hybrid vehicle with front wheel drive. However, the brake controller of the present invention may also be adopted on the hybrid vehicle with rear wheel drive, an electric bicycle, a fuel cell vehicle, and other electric vehicles, as long as the regeneration coordinated brake control is carried out by the hydraulic brake force and the regeneration brake force. In addition, the brake controller of the present invention may also be adopted in an engine vehicle, which uses a brake hydraulic actuator adopting the vehicle-stop-state motor-OFF control and carries out the brake control only by the hydraulic brake force.

The invention claimed is:
1. A vehicle brake controller comprising:
a master cylinder that generates a master cylinder pressure corresponding to a brake operation;
a wheel cylinder arranged at a front or rear wheel to provide a hydraulic brake force corresponding to a wheel cylinder pressure to a corresponding one of the wheels;
a brake hydraulic actuator installed between the master cylinder and the wheel cylinders, the brake hydraulic actuator including a hydraulic pump driven by a pump motor, and a differential pressure valve that controls a differential pressure between the wheel cylinder pressure and the master cylinder pressure;
a vehicle-stop-state motor-OFF controller configured to perform a vehicle-stop-state motor-OFF control that stops the pump motor upon the vehicle being stopped by the brake operation, and that maintains a stop state of the pump motor as is during stopping of the vehicle; and
a pressurization rate controller configured to adjust a pressurization rate of the wheel cylinder pressure to a higher value as a road surface gradient becomes larger, upon resuming operation of the pump motor after the vehicle-stop-state motor-OFF control ends due to acceleration from the vehicle stop state.

2. A vehicle brake controller comprising:
a master cylinder that generates a master cylinder pressure corresponding to a brake operation;
a wheel cylinder arranged at a front or rear wheel to provide a hydraulic brake force corresponding to a wheel cylinder pressure to a corresponding one of the wheels;
a brake hydraulic actuator installed between the master cylinder and the wheel cylinders, the brake hydraulic actuator including a hydraulic pump driven by a pump motor and a differential pressure valve that controls a differential pressure between the wheel cylinder pressure and the master cylinder pressure;
a vehicle-stop-state motor-OFF controller configured to perform a vehicle-stop-state motor-OFF control that stops the pump motor upon the vehicle being stopped by the brake operation, and that maintains a stop state of the pump motor as is during stopping of the vehicle; and
a pressurization rate controller configured to adjust a pressurization rate of the wheel cylinder pressure to a higher value as a road surface gradient becomes larger, upon resuming operation of the pump motor after the vehicle-stop-state motor-OFF control ends due to acceleration from the vehicle stop state;
wherein the pressurization speed controller includes a pressurization gradient restriction section that lowers a gradient by a restriction of a pressurization gradient of the wheel cylinder pressure, and at the same time adjusts the restriction so that the pressurization gradient becomes higher when the road surface gradient is steeper, upon resuming operation of the pump motor after the vehicle-stop-state motor-OFF control ends due to acceleration from the vehicle stop state.

3. The vehicle brake controller according to claim 2, wherein
the pressurization gradient restriction section adjusts the restriction so that the pressurization gradient becomes lower as compared to the pressurization gradient for a sloped road, upon determining the road surface gradient indicates a flat road.

4. The vehicle brake controller according to claim 2, wherein
the pressurization gradient restriction section adjusts the restriction so that the pressurization gradient becomes lower when a drive force direction due to a selected shift position is opposite to a direction of a vehicle force generated on the vehicle due the road surface gradient, and the pressurization gradient becomes higher when either the selected shift position is selected so that no drive force is generated or the drive force direction generated due to the selected shift position is in the same direction as the force generated on the vehicle by the road surface gradient.

5. The vehicle brake controller according to claim 2, wherein
the vehicle brake controller includes a pedal depressing speed computing section that computes a brake pedal depressing speed by a driver when accelerating from the vehicle stop state; and
the pressurization gradient restriction section changes the restriction so that the pressurization gradient becomes higher when the brake pedal depressing speed is faster.

6. The vehicle brake controller according to claim 3, wherein
the pressurization gradient restriction section adjusts the restriction so that the pressurization gradient becomes lower when a drive force direction due to a selected shift position is opposite to a direction of a vehicle force generated on the vehicle due the road surface gradient, and the pressurization gradient becomes higher when either the selected shift position is selected so that no drive force is generated or the drive force direction generated due to the selected shift position is in the same direction as the force generated on the vehicle by the road surface gradient.

7. The vehicle brake controller according to claim 3, wherein
the vehicle brake controller includes a pedal depressing speed computing section that computes a brake pedal depressing speed by a driver when accelerating from the vehicle stop state; and
the pressurization gradient restriction section changes the restriction so that the pressurization gradient becomes higher when the brake pedal depressing speed is faster.

8. The vehicle brake controller according to claim 4, wherein
the vehicle brake controller includes a pedal depressing speed computing section that computes a brake pedal depressing speed by a driver when accelerating from the vehicle stop state; and
the pressurization gradient restriction section changes the restriction so that the pressurization gradient becomes higher when the brake pedal depressing speed is faster.

* * * * *